US008949397B2

(12) United States Patent
George

(10) Patent No.: US 8,949,397 B2
(45) Date of Patent: Feb. 3, 2015

(54) MAINTENANCE METHODS, DEVICES AND SYSTEMS FOR MOBILE COMMUNICATIONS SYSTEM

(75) Inventor: Richard John George, Waterloo (CA)

(73) Assignee: BlackBerry Limited, Waterloo (CA)

( * ) Notice: Subject to any disclaimer, the term of this patent is extended or adjusted under 35 U.S.C. 154(b) by 827 days.

(21) Appl. No.: 12/578,665

(22) Filed: Oct. 14, 2009

(65) Prior Publication Data
US 2011/0087763 A1 Apr. 14, 2011

(51) Int. Cl.
G06F 15/173 (2006.01)
H04W 24/08 (2009.01)

(52) U.S. Cl.
CPC ..................................... *H04W 24/08* (2013.01)
USPC ............ 709/223; 709/224; 455/423; 455/425

(58) Field of Classification Search
USPC .......................... 709/223, 224; 455/423, 425
See application file for complete search history.

(56) References Cited

U.S. PATENT DOCUMENTS

| | | | |
|---|---|---|---|
| 6,169,517 B1 | 1/2001 | Eslambolchi et al. | |
| 6,232,915 B1 | 5/2001 | Dean et al. | |
| 6,298,233 B1 | 10/2001 | Souissi et al. | |
| 6,459,695 B1 | 10/2002 | Schmitt | |
| 6,806,813 B1 | 10/2004 | Cheng et al. | |
| 6,873,949 B2 | 3/2005 | Hickman et al. | |
| 6,968,185 B2 | 11/2005 | Chitrapu et al. | |
| 7,058,542 B2 | 6/2006 | Hauhia et al. | |
| 7,136,636 B1 | 11/2006 | McLaughlin | |
| 7,206,573 B1 | 4/2007 | Weaver et al. | |
| 7,206,743 B2 | 4/2007 | Bonnifait et al. | |
| 7,292,849 B2 | 11/2007 | Merritt | |
| 7,319,847 B2 | 1/2008 | Xanthos et al. | |
| 2003/0055666 A1 | 3/2003 | Roddy et al. | |
| 2004/0049345 A1 | 3/2004 | McDonough et al. | |
| 2004/0203668 A1 | 10/2004 | Bowne et al. | |
| 2004/0203855 A1 | 10/2004 | Veerasamy et al. | |
| 2005/0060364 A1* | 3/2005 | Kushwaha et al. | ........... 709/200 |
| 2005/0282531 A1 | 12/2005 | Andreasson | |
| 2006/0023642 A1* | 2/2006 | Roskowski et al. | ........... 370/254 |

(Continued)

OTHER PUBLICATIONS

European Search Report, European Patent Application No. 09173061, Mar. 25, 2010.

(Continued)

*Primary Examiner* — Joon H Hwang
*Assistant Examiner* — Cheikh Ndiaye
(74) *Attorney, Agent, or Firm* — Ridout & Maybee LLP

(57) ABSTRACT

A maintenance method includes a maintenance module 280*a* operating on a mobile communications device 201 to cause the device to determine if the mobile communications device is in a device context as specified by a device context condition set 311, and if so then to cause the device to collect an actual device context parameter set 323 of device context parameters specified in a desired device context parameter set 315 of device context parameters. A mobile communications device 201 including a handheld casing enclosing a central processing unit 240, wireless communications capabilities 262, 211, and a maintenance module 280*a* providing instructions which, when operating on the central processing unit 240, cause the device 201 to determine if the mobile communications device 201 is in a device context as specified by a device context condition set 311, and if so then to collect from the device an actual device context parameter set 323 of device context parameters specified in a desired device context parameter set 315.

19 Claims, 6 Drawing Sheets

(56) References Cited

U.S. PATENT DOCUMENTS

| | | |
|---|---|---|
| 2006/0069755 A1 | 3/2006 | Peng |
| 2006/0111040 A1 | 5/2006 | Jenkins et al. |
| 2006/0203738 A1 | 9/2006 | Fok et al. |
| 2006/0217116 A1* | 9/2006 | Cassett et al. ............... 455/423 |
| 2006/0224730 A1 | 10/2006 | Fok et al. |
| 2006/0233114 A1 | 10/2006 | Alam et al. |
| 2007/0015538 A1 | 1/2007 | Wang |
| 2007/0071209 A1* | 3/2007 | Horvitz et al. ........... 379/201.06 |
| 2007/0106784 A1 | 5/2007 | Dickman |
| 2010/0041391 A1* | 2/2010 | Spivey et al. ............... 455/425 |

OTHER PUBLICATIONS

J. Rosenberg, A data model for presence, IETF Standard, Jul. 2006, RFC 4479.

H. Schulzrinne, RPID: Rich Presence Extensions to the Presence data Data Format (PIDF), IETF Standard, Jul. 2006, RFC 4480.

Jouni Pyotsia and Harri Cederlof, Remote Wireless Presence in Field Device Management, article, originally published in InTech, Mar. 2001.

IP Multimedia Subsystem, article, en.wikipedia.org, accessed Nov. 27, 2008.

OSI Model, article, en.wikipedia.org, accessed Oct. 24, 2008.

Session Initiation Protocol, article, en.wikipedia.org, accessed Nov. 27, 2008.

What is Presence Technology?, article, searchunifiedcommunications.techtarget.com, accessed Dec. 3, 2008.

Brien M. Posey, The Benefits and Challenges of Presence within Unified Communications, article, Jan. 19, 2008, searchunifiedcommunications.techtarget.com.

Robin Bloor, What is a Presence Server and Why Do I Need One?, article, Apr. 5, 2008, havemacwillblog.com.

J. Rosenberg et al., SIP: Session Initiation Protocol, memorandum, Jun. 2002, The Internet Society.

Canadian Intellectual Property Office, "Examiner's Requisition" for Canadian Patent Application No. 2,717,556, dated Mar. 7, 2013, Canada.

Li, Sara Xueqing—Canadian Intellectual Property Office, "Examiner's Requisition" for Canadian Patent Application No. 2,717,556 dated Dec. 17, 2013.

Office Action dated Jun. 10, 2014 from the European Patent Office for the corresponding European Patent Application No. 09173061.4.

* cited by examiner

MAINTENANCE METHODS, DEVICES AND SYSTEMS FOR MOBILE COMMUNICATIONS SYSTEM

TECHNICAL FIELD

The present disclosure relates generally to mobile communications and more particularly to a method, system and mobile device for implementing maintenance in mobile communications systems.

BACKGROUND

Modern communications systems involving mobile communications devices are very complex. Such systems often involve multiple network types. The networks can span large geographical areas with multiple access points. The devices run numerous applications and are often changing locations.

Maintenance of such systems, and the devices and networks used therein, is correspondingly complex and resource intensive.

Improvements to maintenance methods and apparatuses for the maintenance of mobile communications systems and the networks and devices used therein are desirable.

BRIEF DESCRIPTION OF THE DRAWINGS

Like reference numerals are used in the drawings to denote like elements and features.

DETAILED DESCRIPTION OF EXAMPLE EMBODIMENTS

Figure 1:
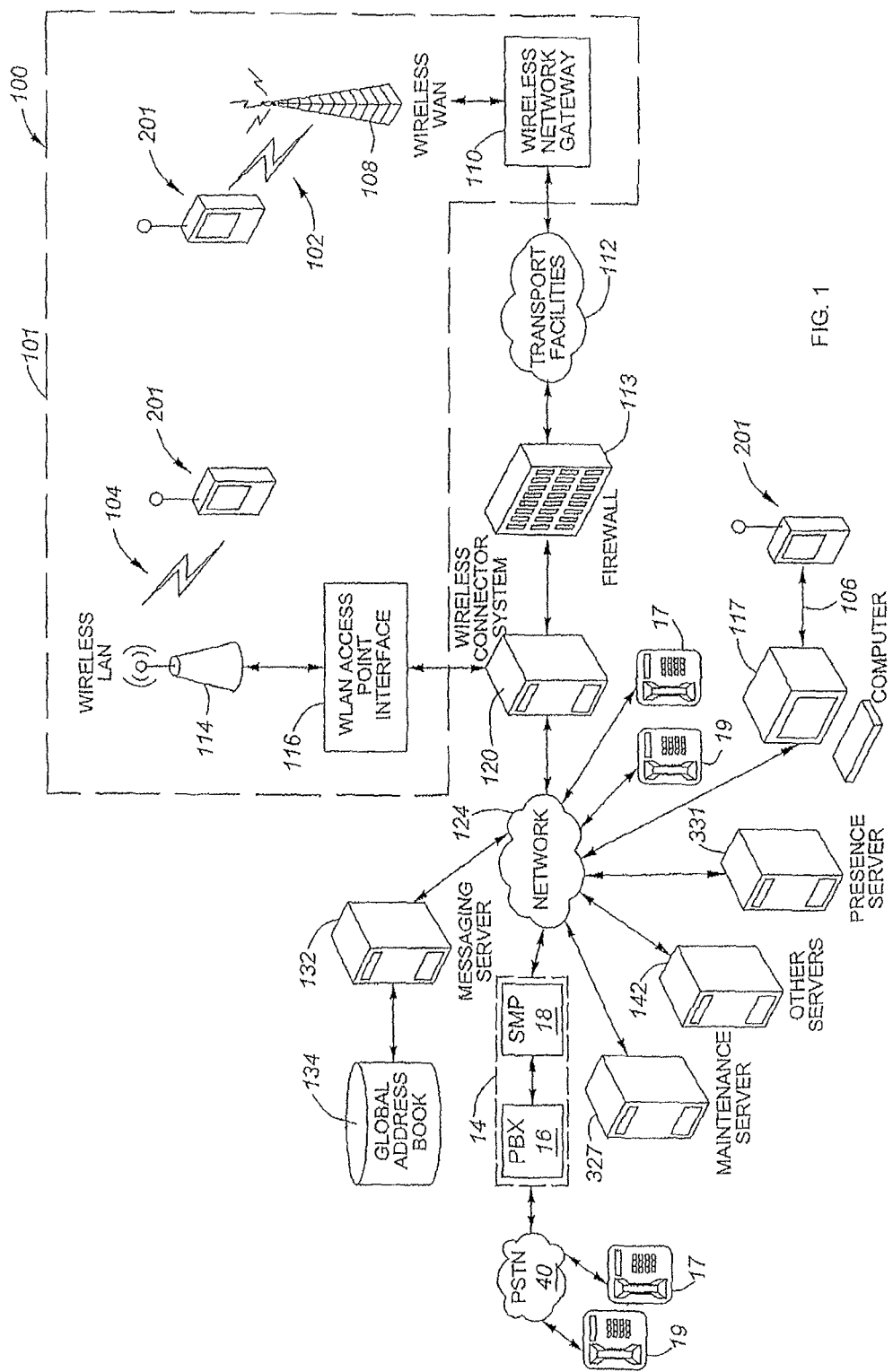
FIG. 1 is a block diagram illustrating a communication system including a mobile communication device in which example embodiments of the present disclosure can be applied.

The present disclosure provides an example embodiment of a maintenance method that includes a maintenance module 280a operating on a mobile communications device 201 to cause the device 201 to determine if the mobile communications device 201 is in a device context as specified by a device context condition set 311, and if it is determined that the device 201 is in a device context condition as specified by a device context condition set 311 then to cause the device 201 to collect an actual device context parameter set 323 of device context parameters specified in a desired device context parameter set 315 of device context parameters.

The present disclosure also provides an example embodiment of a mobile communications device including a handheld casing enclosing a central processing unit, wireless communications capabilities, and a maintenance module providing instructions which, when operating on the central processing unit, cause the device to determine if the mobile communications device is in a device context as specified by a device context condition set, and if it is determined that the device is in a device context condition as specified by a device context condition set then to collect from the device an actual device context parameter set of device context parameters specified in a desired device context parameter set of device context parameters.

The present disclosure as well provides an example embodiment of a mobile communications system including a plurality of the mobile communications devices, and the maintenance module which also, when operating on the central processing unit, further causes the device to communicate with a maintenance server to provide maintenance data based on the collected context parameters, and the maintenance server, wherein the maintenance server is configured to receive the maintenance data from the device and to perform further maintenance activity utilizing the maintenance data.

The present disclosure further provides an example embodiment of a computer program product including a computer readable medium, and stored on the computer readable medium, the maintenance module.

Communication System

Reference is first made to FIG. 1 which shows in block diagram form a communication system 100 in which example embodiments of the present disclosure can be applied. The communication system 100 comprises a number of mobile communication devices (mobile devices) 201 which may be connected to the remainder of system 100 in any of several different ways. Accordingly, several instances of mobile communication devices 201 are depicted in FIG. 1 employing different example ways of connecting to system 100. Mobile communication devices 201 are connected to a wireless communication network 101 which may comprise one or more of a Wireless Wide Area Network (WWAN) 102 and a Wireless Local Area Network (WLAN) 104 or other suitable network arrangements. In some embodiments, the mobile communication devices 201 are configured to communicate over both the WWAN 102 and WLAN 104, and to roam between these networks. In some embodiments, the wireless network 101 may comprise multiple WWANs 102 and WLANs 104.

The WWAN 102 may be implemented as any suitable wireless access network technology. By way of example, but not limitation, the WWAN 102 may be implemented as a wireless network that includes a number of transceiver base stations 108 (one of which is shown in FIG. 1) where each of the base stations 108 provides wireless Radio Frequency (RF) coverage to a corresponding area or cell. The WWAN 102 is typically operated by a mobile network service provider that provides subscription packages to users of the mobile communication devices 201. In some embodiments, the WWAN 102 conforms to one or more of the following wireless network types: Mobitex Radio Network, DataTAC, GSM (Global System for Mobile Communication), GPRS (General Packet Radio System), TDMA (Time Division Multiple Access), CDMA (Code Division Multiple Access), CDPD (Cellular Digital Packet Data), iDEN (integrated Digital Enhanced Network), EvDO (Evolution-Data Optimized) CDMA2000, EDGE (Enhanced Data rates for GSM Evolution), UMTS (Universal Mobile Telecommunication Systems), HSDPA (High-Speed Downlink Packet Access), IEEE 802.16e (also referred to as Worldwide Interoperability for Microwave Access or "WiMAX"), or various other networks. Although WWAN 102 is described as a "Wide-Area" network, that term is intended herein also to incorporate wireless Metropolitan Area Networks (WMAN) and other similar technologies for providing coordinated service wirelessly over an area larger than that covered by typical WLANs.

The WWAN 102 may further comprise a wireless network gateway 110 which connects the mobile communication devices 201 to transport facilities 112, and through the transport facilities 112 to a wireless connector system 120. Transport facilities may include one or more private networks or lines, the public internet, a virtual private network, or any other suitable network. The wireless connector system 120 may be operated, for example, by an organization or enterprise such as a corporation, university, or governmental department, which allows access to a network 124 such as an internal or enterprise network and its resources, or the wireless connector system 120 may be operated by a mobile network provider. In some embodiments, the network 124 may be realised using the internet rather than an internal or enterprise network.

The wireless network gateway 110 provides an interface between the wireless connector system 120 and the WWAN 102, which facilitates communication between the mobile communication devices 201 and other devices (not shown) connected, directly or indirectly, to the WWAN 102. Accordingly, communications sent via the mobile communication devices 201 are transported via the WWAN 102 and the wireless network gateway 110 through transport facilities 112 to the wireless connector system 120. Communications sent from the wireless connector system 120 are received by the wireless network gateway 110 and transported via the WWAN 102 to the mobile communication devices 201.

The WLAN 104 comprises a wireless network which, in some embodiments, conforms to IEEE 802.11x standards (sometimes referred to as Wi-Fi) such as, for example, the IEEE 802.11a, 802.11b and/or 802.11g standard. Other communication protocols may be used for the WLAN 104 in other embodiments such as, for example, IEEE 802.11n, IEEE 802.16e (also referred to as Worldwide Interoperability for Microwave Access or "WiMAX"), or IEEE 802.20 (also referred to as Mobile Wireless Broadband Access). The WLAN 104 includes one or more wireless RF Access Points (AP) 114 (one of which is shown in FIG. 1) that collectively provide a WLAN coverage area.

The WLAN 104 may be a personal network of the user, an enterprise network, or a hotspot offered by an Internet service provider (ISP), a mobile network provider, or a property owner in a public or semi-public area, for example. The access points 114 are connected to an access point (AP) interface 116 which may connect to the wireless connector system 120 directly (for example, if the access point 114 is part of an enterprise WLAN 104 in which the wireless connector system 120 resides), or indirectly via the transport facilities 112 if the access point 14 is a personal Wi-Fi network or Wi-Fi hotspot (in which case a mechanism for securely connecting to the wireless connector system 120, such as a virtual private network (VPN), may be appropriate). The AP interface 116 provides translation and routing services between the access points 114 and the wireless connector system 120 to facilitate communication, directly or indirectly, with the wireless connector system 120.

The wireless connector system 120 may be implemented as one or more servers, and is typically located behind a firewall 113. The wireless connector system 120 manages communications, including email messages, to and from a set of managed mobile communication devices 201. The wireless connector system 120 also provides administrative control and management capabilities over users and mobile communication devices 201 which may connect to the wireless connector system 120.

The wireless connector system 120 allows the mobile communication devices 201 to access the network 124 and connected resources and services such as a messaging server 132 (for example, a Microsoft Exchange™, IBM Lotus Domino™, or Novell GroupWise™ email messaging server) having a global address book 134, and optionally other servers 142. The other servers 142 may comprise a content server for providing content such as Internet content or content from an organization's internal servers to the mobile communication devices 201 in the wireless network 101, and an application server for implementing server-based applications.

The global address book 134 comprises electronic contact records created and maintained by an IT (information technology) administrator of the network 124. Typically, the global address book is maintained exclusively by the messaging server 132 and there is no local copy on the mobile device 201. In addition, the global address book typically comprises contact records for all users of the respective network 124 (e.g., enterprise). The contact records in the global address book 134 may be one or more of individual contact records (or user records) or a group address or distribution list which lists multiple individual (users).

The wireless connector system 120 typically provides a secure exchange of data (e.g., email messages, personal information manager (PIM) data, and IM data) with the mobile communication devices 201. In some embodiments, communications between the wireless connector system 120 and the mobile communication devices 201 are encrypted. In some embodiments, communications are encrypted using a symmetric encryption key implemented using Advanced Encryption Standard (AES) or Triple Data Encryption Standard (Triple DES) encryption. Private encryption keys are generated in a secure, two-way authenticated environment and are used for both encryption and decryption of data.

The wireless network gateway 110 is adapted to send data packets received from the mobile device 201 over the WWAN 102 to the wireless connector system 120. The wireless connector system 120 then sends the data packets to the appropriate connection point such as the messaging server 132, content server 132 or application servers 136. Conversely, the wireless connector system 120 sends data packets received, for example, from the messaging server 132 or other server 142 to the wireless network gateway 110 which then transmit the data packets to the destination mobile device 201. The AP interfaces 116 of the WLAN 104 provide similar sending functions between the mobile device 201, the wireless connector system 120 and network connection point such as the messaging server 132, content server 132 and application server 136.

The network 124 may comprise a private local area network, metropolitan area network, wide area network, the public Internet or combinations thereof and may include virtual networks constructed using any of these, alone, or in combination. Computers 117 may be connected to the network 124 directly or indirectly via an intermediate communication network such as the Internet 112. When computers 117 connect to the network indirectly, e.g. via the Internet 112, a VPN or other mechanism for securely connecting to the network 124 may be appropriate. Computers 117 may be of any suitable construction and include at least a processor, and a display screen, one or more user input devices, and a memory each connected to the processor as is known in the art. The computers 117 could be desktop computers, laptop/notebook/netbook computers, or combinations thereof, and may have wired or wireless communication subsystems for connecting to the network 124.

A mobile device 201 may alternatively connect to the wireless connector system 120 using a computer 117 via the network 124. In at least some embodiments, for security purposes the computers 117 with which the mobile devices 201 can connect to the wireless connector system 120 are limited to computers 117 which are directly connected to the network 124. A link 106 may be provided for exchanging information between the mobile device 201 and computer 117 connected to the wireless connector system 120. The link 106 may comprise one or both of a physical interface and short-range wireless communication interface. The physical interface may comprise one or combinations of an Ethernet connection, Universal Serial Bus (USB) connection, Firewire™ (also known as an IEEE 1394 interface) connection, or other serial data connection, via respective ports or interfaces of the mobile device 201 and computer 117. The short-range wireless communication interface may be a personal area network (PAN) interface. A personal area network is a wireless point-to-point connection meaning no physical cables are required to connect the two end points.

It will be appreciated that the above-described communication system is provided for the purpose of illustration only, and that the above-described communication system comprises one possible communication network configuration of a multitude of possible configurations for use with the mobile communication devices 201. The teachings of the present disclosure may be employed in connection with any other type of network and associated devices that are effective in implementing or facilitating wireless communication. Suitable variations of the communication system will be understood to a person of skill in the art and are intended to fall within the scope of the present disclosure.

Mobile Communication Device

Figure 2:
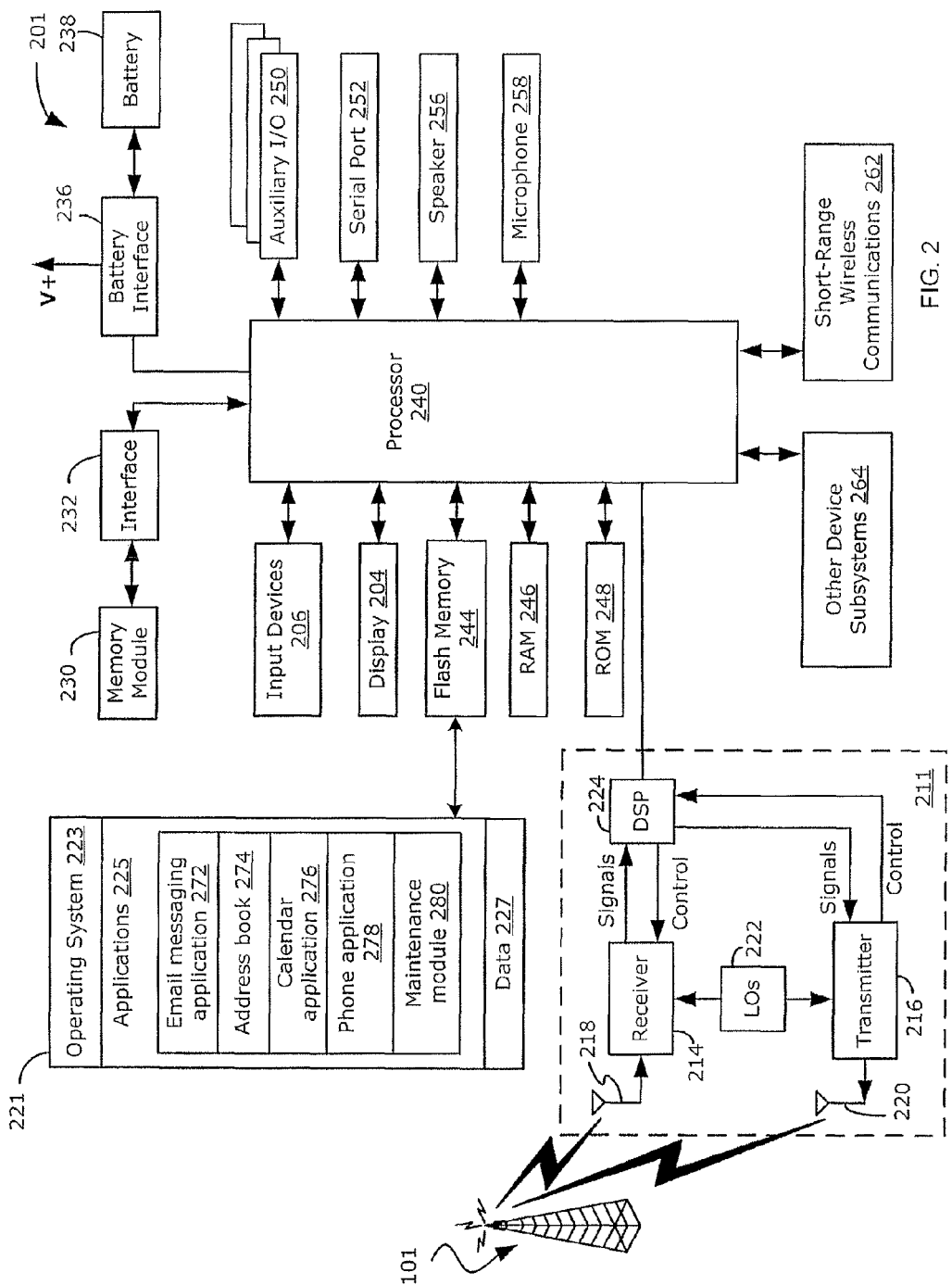
FIG. 2 is a block diagram illustrating a mobile communication device in accordance with one example embodiment of the present disclosure.

Reference is now made to FIG. 2 which illustrates a mobile device 201 in which example embodiments described in the present disclosure can be applied. The mobile device 201 is a two-way communication device having data and voice communication capabilities, and the capability to communicate with other computer systems, for example, via the Internet. Depending on the functionality provided by the mobile device 201, in various embodiments the device 201 may be a multiple-mode communication device configured for both data and voice communication, a smartphone, a mobile telephone or a PDA (personal digital assistant) enabled for wireless communication, or a computer system with a wireless modem.

The mobile device 201 includes a rigid case (not shown) housing the components of the device 201. Some internal components of the device 201 are constructed on a printed circuit board (PCB). The mobile device 201 includes a controller comprising at least one processor 240 (such as a microprocessor) which controls the overall operation of the device 201. The processor 240 interacts with device subsystems such as a wireless communication subsystem 211 for exchanging radio frequency signals with the wireless network 101 to perform communication functions. The processor 240 interacts with additional device subsystems including a display screen 204 such as a liquid crystal display (LCD) screen, input devices 206 such as a keyboard and control buttons, flash memory 244, random access memory (RAM) 246, read only memory (ROM) 248, auxiliary input/output (I/O) subsystems 250, data port 252 such as serial data port, such as a Universal Serial Bus (USB) data port, speaker 256, microphone 258, short-range communication subsystem 262, and other device subsystems generally designated as 264. Some of the subsystems shown in FIG. 2 perform communication-related functions, whereas other subsystems may provide "resident" or on-device functions.

The device 201 may comprise a touchscreen display in some embodiments. The touchscreen display may be constructed using a touch-sensitive input surface connected to an electronic controller and which overlays the display screen 204. The touch-sensitive overlay and the electronic controller provide a touch-sensitive input device and the processor 240 interacts with the touch-sensitive overlay via the electronic controller.

The communication subsystem 211 includes a receiver 214, a transmitter 216, and associated components, such as one or more antenna elements 218 and 220, local oscillators (LOs) 222, and a processing module such as a digital signal processor (DSP) 224. The antenna elements 218 and 220 may be embedded or internal to the mobile device 201 and a single antenna may be shared by both receiver and transmitter, as is known in the art. As will be apparent to those skilled in the field of communication, the particular design of the wireless communication subsystem 211 depends on the wireless network 101 in which mobile device 201 is intended to operate.

The mobile device 201 may communicate with any one of a plurality of fixed transceiver base stations 108 of the wireless network 101 within its geographic coverage area. The mobile device 201 may send and receive communication signals over the wireless network 101 after the required network registration or activation procedures have been completed. Signals received by the antenna 218 through the wireless network 101 are input to the receiver 214, which may perform such common receiver functions as signal amplification, frequency down conversion, filtering, channel selection, etc., as well as analog-to-digital (A/D) conversion. A/D conversion of a received signal allows more complex communication functions such as demodulation and decoding to be performed in the DSP 224. In a similar manner, signals to be transmitted are processed, including modulation and encoding, for example, by the DSP 224. These DSP-processed signals are output to the transmitter 216 for digital-to-analog (D/A) conversion, frequency up conversion, filtering, amplification, and transmission to the wireless network 101 via the antenna 220. The DSP 224 not only processes communication signals, but may also provide for receiver and transmitter control. For example, the gains applied to communication signals in the receiver 214 and the transmitter 216 may be adaptively controlled through automatic gain control algorithms implemented in the DSP 224.

The processor 240 operates under stored program control and executes software modules 221 stored in memory such as persistent memory, for example, in the flash memory 244. As illustrated in FIG. 2, the software modules 221 comprise operating system software 223, software applications 225 comprising an email messaging application 272 (also referred to as an email client 272), a personal address book 274, a calendar application 276, a phone application 278, and maintenance module 280. An example embodiment of a maintenance module 280 will be discussed in detail later herein.

The software applications 225 also may include a range of applications, including, for example, a notepad application, Internet browser application, voice communication (i.e. telephony) application, mapping application, or a media player application, or any combination thereof. Each of the software applications 225 may include layout information defining the placement of particular fields and graphic elements (e.g. text fields, input fields, icons, etc.) in the user interface (i.e. the display screen 204) according to the application.

Those skilled in the art will appreciate that the software modules 221 or parts thereof may be temporarily loaded into volatile memory such as the RAM 246. The RAM 246 is used for storing runtime data variables and other types of data or information, as will be apparent to those skilled in the art. Although specific functions are described for various types of memory, this is merely one example, and those skilled in the art will appreciate that a different assignment of functions to types of memory could also be used.

In some embodiments, the auxiliary I/O subsystems 250 may comprise an external communication link or interface, for example, an Ethernet connection. The mobile device 201 may comprise other wireless communication interfaces for communicating with other types of wireless networks, for example, a wireless network such as an orthogonal frequency division multiplexed (OFDM) network or a GPS (Global Positioning System) subsystem comprising a GPS receiver or transceiver for communicating with a GPS satellite network (not shown). The auxiliary I/O subsystems 250 may comprise a pointing or navigational input device such as a clickable trackball or scroll wheel or thumbwheel, or a vibrator for providing vibratory notifications in response to various events on the device 201 such as receipt of an electronic message or incoming phone call, or for other purposes such as haptic feedback (touch feedback).

In some embodiments, the mobile device 201 also includes a removable memory card or module 230 (typically comprising flash memory) and a memory card interface 232. Network access is typically associated with a subscriber or user of the mobile device 201 via the memory card 230, which may be a Subscriber Identity Module (SIM) card for use in a GSM network or other type of memory card for use in the relevant wireless network type. The memory card 230 is inserted in or connected to the memory card interface 232 of the mobile device 201 in order to operate in conjunction with the wireless network 101.

The mobile device 201 also stores other data 227 in an erasable persistent memory, which in one example embodiment is the flash memory 244. In various embodiments, the data 227 includes service data comprising information required by the mobile device 201 to establish and maintain communication with the wireless network 101. The data 227 may also include user application data such as email messages, address book and contact information, calendar and schedule information, notepad documents, image files, and other commonly stored user information stored on the mobile device 201 by its user, and other data. The data 227 stored in the persistent memory (e.g. flash memory 244) of the mobile device 201 may be organized, at least partially, into a number of databases each containing data items of the same data type or associated with the same application. For example, email messages, contact records, and task items may be stored in individual databases within the device memory.

The mobile device 201 also includes a battery 238 as a power source, which is typically one or more rechargeable batteries that may be charged, for example, through charging circuitry coupled to a battery interface such as the serial data port 252. The battery 238 provides electrical power to at least some of the electrical circuitry in the mobile device 201, and the battery interface 236 provides a mechanical and electrical connection for the battery 238. The battery interface 236 is coupled to a regulator (not shown) which provides power V+ to the circuitry of the mobile device 201.

The short-range communication subsystem 262 is an additional optional component which provides for communication between the mobile device 201 and different systems or devices, which need not necessarily be similar devices. For example, the subsystem 262 may include an infrared device and associated circuits and components, or a wireless bus protocol compliant communication mechanism such as a Bluetooth® communication module to provide for communication with similarly-enabled systems and devices.

A predetermined set of applications that control basic device operations, including data and possibly voice communication applications will normally be installed on the mobile device 201 during or after manufacture. Additional applications and/or upgrades to the operating system 221 or software applications 225 may also be loaded onto the mobile device 201 through the wireless network 101, the auxiliary I/O subsystem 250, the serial port 252, the short-range communication subsystem 262, or other suitable subsystem 264. The downloaded programs or code modules may be permanently installed, for example, written into the program memory (i.e. the flash memory 244), or written into and executed from the RAM 246 for execution by the processor 240 at runtime. Such flexibility in application installation increases the functionality of the mobile device 201 and may provide enhanced on-device functions, communication-related functions, or both. For example, secure communication applications may enable electronic commerce functions and other such financial transactions to be performed using the mobile device 201.

The mobile device 201 may provide two principal modes of communication: a data communication mode and an optional voice communication mode. In the data communication mode, a received data signal such as a text message, an email message, or Web page download will be processed by the communication subsystem 211 and input to the processor 240 for further processing. For example, a downloaded Web page may be further processed by a browser application or an email message may be processed by the email messaging application and output to the display 204. A user of the mobile device 201 may also compose data items, such as email messages, for example, using the input devices in conjunction with the display screen 204. These composed items may be transmitted through the communication subsystem 211 over the wireless network 101.

In the voice communication mode, the mobile device 201 provides telephony functions and operates as a typical cellular phone. The overall operation is similar, except that the received signals would be output to the speaker 256 and signals for transmission would be generated by a transducer such as the microphone 258. The telephony functions are provided by a combination of software/firmware (i.e., the voice communication module) and hardware (i.e., the microphone 258, the speaker 256 and input devices). Alternative voice or audio I/O subsystems, such as a voice message recording subsystem, may also be implemented on the mobile device 201. Although voice or audio signal output is typically accomplished primarily through the speaker 256, the display screen 204 may also be used to provide an indication of the identity of a calling party, duration of a voice call, or other voice call related information.

Maintenance Module

Figure 3:
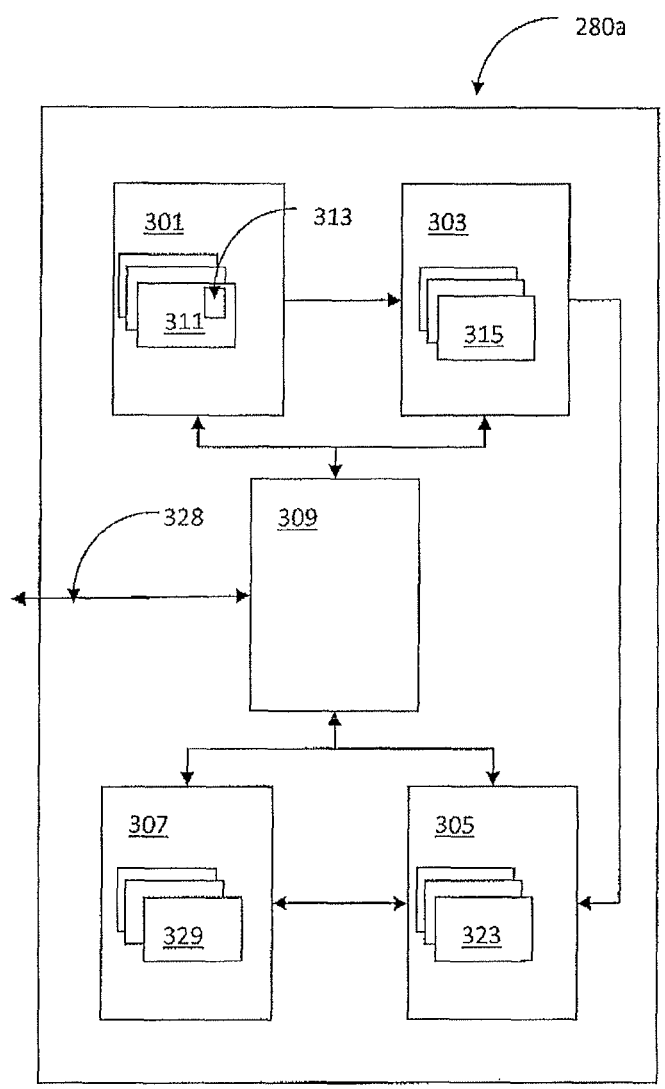
FIG. 3 is a block diagram illustrating is an example maintenance module for use in the device of FIG. 2.

Referring to FIG. 3, one embodiment 280a of the maintenance module 280 of FIG. 2 has a device context condition sub-module 301, a device context collection sub-module 303, a device context logging module 305, a device context analysis engine 307 and a maintenance communications sub-module 309.

Context conditions can be based on presence data such as that used to determine availability of a user of the device 201 to participate in communications, for example if the device is in the user's office and not in use. Such information can be determined at the device 201, for example, by checking a GPS location of the device 201 against a known location of the user's office. Usage of the device 201 can, for example, be determined from device application status information or CPU usage.

The device context condition sub-module 301 has one or more device context sets 311. A device context condition set 311 defines a potential context of the device 201 using device context conditions 313. A device condition context condition set 311 may be as simple as one device context condition 313, for example, a particular time of day. Alternatively, a device context condition set 311 may include a plurality of device context conditions 313, such as location of the device 201, time of day, and application running on the device.

It is recognized that the maintenance module 280a and its various components as described herein can form a discrete module running on the device 201, or the functions of the maintenance module 280a can be distributed on the device 201 as separate modules or integrated within other existing modules as desired. Such discrete or distributed implementations all fall within the embodiments of a maintenance module 280a as described herein.

The device context sub-module 301 determines if the actual device context meets one or more device context sets 311. If so, a context collection sub-module 303 is activated.

The device context collection sub-module 303 has one or more desired context parameter sets 315. A desired context parameter set 315 may be, for example, received signal strength at the receiver 218. Alternatively, a desired context parameter set 315 may be more extensive, including a plurality of operating parameters of the device such as states of the operating system 223 and applications 225, and readings through input devices 206 or auxiliary I/O devices 250. Each desired context parameter set is associated with one or more device context condition sets 311.

The device context collection can have a plurality of sub-modules 303, for example, one for each desired context condition set 311. The sub-modules 303 may come into being in the form of a crawler, or bots, spawned by the maintenance module 280a when a context condition set 311 is met.

The device context collection sub-module 303 collects actual device context parameters for the associated desired context parameter set 315 when activated by the device context sub-module 301 upon determination that the actual device context meets the associated device context condition set 311.

Device context logging sub-module 305 stores actual context parameter sets 323 collected by the device context collection sub-module 303 in association with the associated device context condition set 311.

Analysis engine 307 analyses context parameter sets 323 sets logged by the context logging sub-module 305 to determine if the logged context parameters sets 323 indicate maintenance to the device 201, a network or other element of the communications system may be required. For example, the analysis engine 307 may compare separate sets 323 of logged parameters collected over different instances of a context condition set 311 to determine a baseline and then to determine if significant changes from the baseline have occurred. This allows for on-device prediction of possible future failure in a system 100 component, such as the network 124 or a device 201. This allows for predictive or preventive maintenance to occur.

Maintenance communications sub-module 309 is used by the maintenance module 280a to initiate or receive communications 328 from a remote maintenance system, such as maintenance server 327 (FIG. 1). Communication between the maintenance server 327 and the sub-module 309 can take place through one or more of the communications capabilities of the device 201, such as the wireless subsystem 211 over either a WLAN 104 or WWAN 108, or the short range wireless communication system 262, or a physical interface such as described previously with regard to link 106.

The maintenance module 280a can initiate communications with the maintenance server 280a to transfer context parameter sets 323 to the maintenance server 327 for analysis. Such sets 323 may be transferred as the sets 323 are collected, or after storage by the context logging sub-module 305. Such collected parameter sets 323 form maintenance data.

The maintenance module 280a can initiate communications through the communications sub-module 309 to transfer results 329 of the analysis engine 307. Such results form maintenance data. This allows for shared participation in maintenance analysis between the device 201 and the maintenance server 327.

The maintenance module 280a can receive communications from the maintenance server 327. Such communications may include uploading updates to the maintenance module 280a. Such communications may include uploading context condition sets 311 and desired context parameter sets 315.

The maintenance module 280a and maintenance server 327 can open an interactive maintenance communications channel for communications between the maintenance module 280a and maintenance server 327. The maintenance module 280a can communicate the type of information described above to the maintenance server 327, and the maintenance server 327 can direct maintenance activities for the device 201 through the maintenance modules, such as providing further desired context parameter sets 315 to cause collection of additional actual context parameter sets 323. Settings of the device 201 may be altered by the maintenance server 327 through the maintenance module 280a between collection of context parameter sets 323, if desired.

A communication channel can be opened through one of the communications capabilities of the device 201. For example, a communications channel may be opened through the WWAN, WLAN, or via a computer 117 through the link 106. The multi-channel capability of the device 201 allows communication between the maintenance server 327 and the device 201 through one channel, while collecting context parameters through a device 201 capability employed in another channel. For example, to test operation of the WLAN or WWAN context of the device 201, such as signal strength, protocol, access points, a channel could be opened between the maintenance server 327 and the device 20 using the link 106 to receive instructions or other communications from the maintenance server 327 and provide test results to the maintenance server 327. Use of the WLAN while testing operation of the WWAN, or vice versa, may require independent implementations of the wireless communication subsystem or aspects thereof.

Multiple devices 201 can be maintained through the maintenance server 327. The maintenance server 327 can aggregate context data from the devices 201 to determine proper and improper operating contexts for the elements in the communications system. For example, the maintenance server 327 can learn a set of context parameters for various context conditions from the various devices 201 during normal operation. The maintenance server 327 can then test to see that other devices 201 are experiencing similar context parameters under the same context conditions.

Where presence data is being used the context condition sub-module 301 can be a presence sub-module possibly operating as a service on the device 201, or incorporate a presence service operating within the sub-module 301.

Presence data can also be collected externally, other than by the device, for example, through the enterprise network. For example, presence data can be collected from a PBX through which a user's office telephone is connected. If the PBX indicates that the user is using the landline then it may be deduced that the user is in the user's office.

External presence data can be acquired by the device 201 directly from a presence data source, possibly through one or more interfaces. Alternatively, presence data can be obtained from the source, possibly through one or more interfaces, by a presence server 331. The device 201 can then obtain the presence data from the presence server 331. Thus, the presence server 331 is a source of presence data to the device 201. The presence server 331 can aggregate presence data from a number of different sources for the device 201. The presence server 331 can perform presence data acquisition and aggregation for a plurality of different devices 201.

The presence server 331 may generate and make available Presence data Data Format (PIDF) documents or Rich Presence data Data format (RPID) documents containing presence data for a particular user. The availability information may include information regarding the various devices associated with the user and their state of connectivity, the services provided by those devices. Further details regarding presence data models and PIDF and RPID documents may be found in IETF standards, including J. Rosenberg, "A data model for presence", RFC 4479, July 2006 and H. Schulzrinne, "RPID: Rich Presence Extensions to the Presence data Data Format (PIDF)", RFC 4480, July 2006.

The presence server 331 can act on a "push" or "pull" model, sending presence data to the device 201 as the presence data is updated or waiting for the device 201 to poll the presence server 331 for updated presence data. In a push model, the maintenance module can be triggered to determine whether or not the device is in a given context condition set upon receipt of updated presence data.

As an example embodiment of the operation of a device 201 within a communication system 100, the maintenance module 280a has a context condition set with the following conditions: the device is in the user's office and will not be in use and is not likely to be used for a few minutes. The device reviews its available presence data to determine that the landline phone is in use in the user's office, the device has just been used, and the user is scheduled to be in a meeting for an hour. From this presence data it can be surmised that the user has the device in the user's office and will be busy for an hour and unlikely to use the device. The device determines that the device context conditions have been met. The device then collects device context parameters in accordance with the desired device context parameter set, for example, a series of background WLAN interference measurements. The collected parameters can be stored on the device or reported to the maintenance server 327, or both.

Presence data indicating the user's busy status can be collected for example from the calendar application 276 which may indicate that the user is scheduled to be in a meeting for an hour.

Newly collected parameters can be compared against past results of the parameter collection, from the device 201, or other devices 201 in similar contexts, to determine if there are anomalies in the collected parameters that possibly warrant maintenance. Where there are anomalies, then the device 201 updates the maintenance server 327 such that the maintenance server 327 can notify a system 100 administrator to perform maintenance. Performing maintenance in this way can include preventive or predictive maintenance. Anomalies detected in this manner can be indicative of a future failure that can be avoided by performing maintenance in advance.

As an example, if the above collection of background WLAN interference measurements indicates similar readings over separate collections and then a reading is collected that when compared against an earlier parameter collection indicates a significant decline from an access point 114, the maintenance module 280a can notify the maintenance server 327 which then notifies an administrator such that the administrator can check the access point 114.

In this way, the maintenance module 280a operating on the device 201 acts as an autonomous maintenance agent in the system 100.

An example embodiment of a maintenance method includes a maintenance module 280a operating on a mobile communications device 201 to cause the device 201 to determine if the mobile communications device 201 is in a device context as specified by a device context condition set 311, and if it is determined that the device 201 is in a device context condition as specified by a device context condition set 311 then to cause the device 201 to collect an actual device context parameter set 323 of device context parameters specified in a desired device context parameter set 315 of device context parameters.

The method can also include the maintenance module 280a storing the collected actual device context parameter set 323 on the device 201.

The method can also include the maintenance module 280a analysing the actual device context parameter set 323 to determine if maintenance is required to a mobile communications system 100 associated with the device 201.

The method can also include the device context condition set 311 including conditions based on presence data for the device 201.

The method can also include obtaining presence data by the device 201 from sources 206, 250 on the device 201.

The method can also include obtaining presence data by the device 201 from a source 331 of presence data external to the device 201.

The method can also include the maintenance module 280a maintaining a communications channel 328 between the external source 331 of presence data and the device 201 through one channel 250, 206, 211 while collecting device context parameters through a device capability 211, 250, 206 for another communications channel 211, 250, 206.

The method can include the device context condition set 311 indicating that the device 201 is likely to remain in the device context while collection of the device context parameter set 315 occurs.

The method can further include the maintenance module 280a comparing the collected actual device context parameters 323 to normal device context parameters for the device context to determine if there are anomalies in the device context.

The method can also include the maintenance module 280a determining normal device context parameters by determining if a mobile communications device 201 is in a device context as specified by a device context condition set 311, and if so then collecting from the device 201 an actual device context parameter set 323 of device context parameters specified in a desired device context parameter set 315 of device context parameters, and deriving normal device context parameters from the actual device context parameter set 323 collected as part of determining normal operating device context parameters.

The method can also include transmitting the collected actual context parameter set 323 to a maintenance server 327.

The method can further include the maintenance module 280a analysing the actual device context parameter 323 set to determine if maintenance is required to a mobile communications system 100 of the device 201, and notifying a maintenance server 327.

The method can further include maintaining a communications channel 250, 206, 211 between the maintenance server 327 and the device 201 through one channel, while collecting device context parameters through a device capability 211, 250, 206 for another communications channel 211, 250, 206.

The method can further include using a session based communication channel 250, 206, 211 as the maintained communication channel 250, 206, 211.

The maintenance module 280a can collect context parameters from within the device itself, such as one or more operating states. The maintenance module 280a can also collect context parameters from external to the device 201 using the input devices 206 and auxiliary I/O 250. As an example context parameters such as GPS location can be collected using a GPS (Global Positioning System) subsystem comprising a GPS receiver or transceiver for communicating with a GPS satellite network (not shown). As a further example context parameters can be collected through the wireless communication subsystem 211, such as received signal strength, or background interference measurements.

Figure 4:
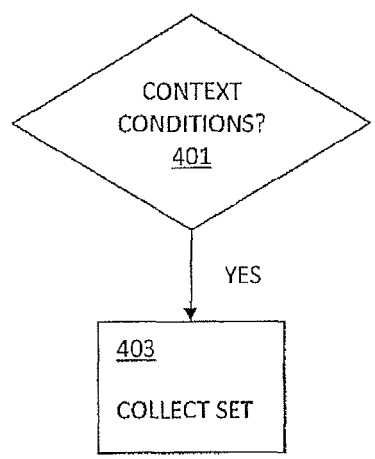
FIG. 4 is a flowchart illustrating an example method of a maintenance method in accordance with one example embodiment of the present disclosure.

Referring to FIG. 4, at 401 an example embodiment of a maintenance method includes a maintenance module 280a operating on a mobile communications device 201 to cause the device 201 to determine if the mobile communications device 201 is in a device context as specified by a device context condition set 311, and, at 403, if it is determined that the device 201 is in a device context condition as specified by a device context condition set 311 then to cause the device 201 to collect an actual device context parameter set 323 of device context parameters specified in a desired device context parameter set 315 of device context parameters.

Figure 5:
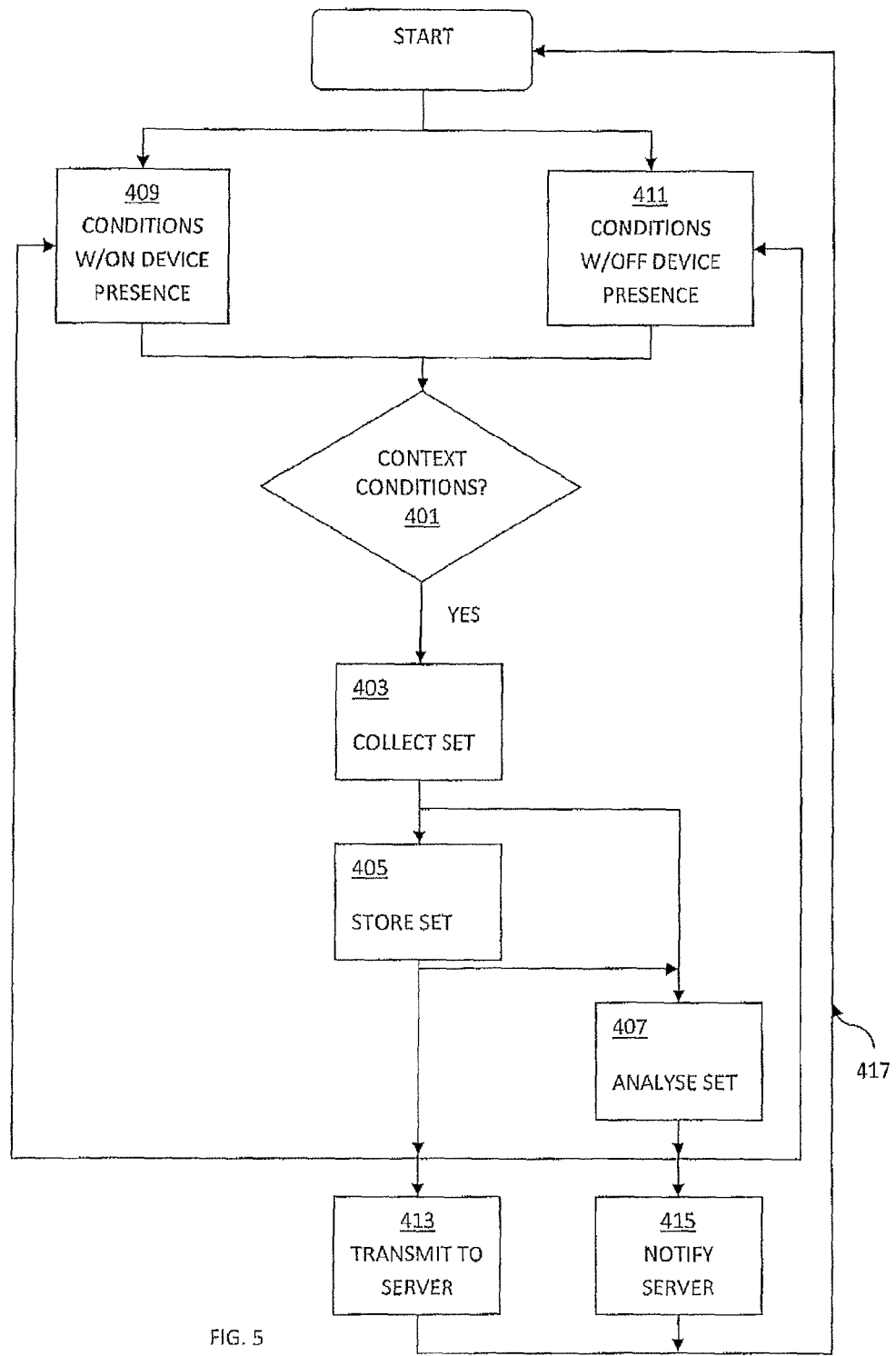
FIG. 5 is a flowchart illustrating a further example method of a maintenance method in accordance with another example embodiment of the present disclosure.

Referring to FIG. 5, the method can also include at 405 the maintenance module 280a storing the collected actual device context parameter set 323 on the device 201.

The method can also include at 407 the maintenance module 280a analysing the actual device context parameter set 323 to determine if maintenance is required to a mobile communications system 100 associated with the device 201.

The method can also include the device context condition set 311 including conditions based on presence data for the device 201.

The method can also include at 409 the device 201 obtaining presence data from sources 206, 250 on the device 201.

The method can also include at 411 the device 201 obtaining presence data from a source 331 of presence data external to the device 201.

The method can also include the maintenance module 280a maintaining a first communications channel 328, 250, 206, 211 between the external source 331 of presence data and the device 201 while collecting device context parameters through a device capability 211, 250, 206 for a second communications channel 211, 250, 206.

The method can include at 409 or 411 the device context condition set 311 indicating that the device 201 is likely to remain in the device context while collection of the device context parameter set 315 occurs.

The method can further include at 407 the maintenance module 280a comparing the collected actual device context parameters 323 to normal device context parameters for the device context to determine if the device context is normal.

The method can also include the maintenance module 280a determining normal device context parameters by determining if a mobile communications device 201 is in a device context as specified by a device context condition set 311, and if so then collecting from the device 201 an actual device context parameter set 323 of device context parameters specified in a desired device context parameter set 315 of device context parameters, and deriving normal device context parameters from the actual device context parameter set 323 collected as part of determining normal operating device context parameters.

The method can also include transmitting the collected actual context parameter set 323 to a maintenance server 327.

The method can further include at 407 the maintenance module 280a analysing the actual device context parameter 323 set to determine if maintenance is required to a mobile communications system 100 of the device 201, and at 415 notifying a maintenance server 327.

The method can further include at 417 maintaining a first communications channel 250, 206, 211 between the maintenance server 327 and the device 201, while collecting device context parameters through a device capability 211, 250, 206 for another communications channel 211, 250, 206.

The method can further include at 417 the maintained communication channel 250, 206, 211 being a session based communication channel 250, 206, 211.

Service Management Platform

Referring again to FIG. 1, an example service management platform 18 can be used to provide session based communication channels to collect presence data from sources external to the device 201, such as PBX\IP-PBX 16.

The service management platform 18 can also provide session based communication channels between the maintenance server 327 and the device 201. Alternatively, the functions of the maintenance server 327 can be performed by a maintenance application running on the session management platform with session based communications between the device 201 and the maintenance application.

Embodiments of the present application are not limited to any particular operating system, mobile device architecture, server architecture, or computer programming language.

Although reference may be made to "calls" in the description of example embodiments below, it will be appreciated that the described systems and methods are applicable to session-based communications in general and not limited to voice calls. It will also be appreciated that the systems and methods may not be limited to sessions and may be applicable to messaging-based communications in some embodiments.

The communication system 100 may include a Private Branch eXchange (although in various embodiments the PBX may be a standard PBX or an IP-PBX, for simplicity the description below uses the term PBX to refer to both) 16 having a connection with a Public Switched Telephone Network (PSTN) 40 for routing incoming and outgoing voice calls. The PBX 16 is connected to the PSTN 40 via DID trunks or PRI trunks, for example. The PBX 16 may use ISDN signaling protocols for setting up and tearing down circuit-switched connections through the PSTN 40 and related signaling and communications. In some embodiments, the PBX 16 may be connected to one or more conventional analog telephones 19. The PBX 16 is also connected to the enterprise network 124 and, through it, to telephone terminal devices, such as digital telephone sets 17, softphones operating on computers, etc. Within the enterprise, each individual may have an associated extension number, sometimes referred to as a PNP (private numbering plan), or direct dial phone number. Calls outgoing from the PBX 16 to the PSTN 40 or incoming from the PSTN 40 to the PBX 16 are typically circuit-switched calls. Within the enterprise, e.g. between the PBX 16 and terminal devices, voice calls are often packet-switched calls, for example Voice-over-IP (VoIP) calls.

The communications system 100 may further include a Service Management Platform (SMP) 18 for performing some aspects of messaging or session control, like call control and advanced call processing features. The SMP 18 may, in some cases, also perform some media handling. Collectively the SMP 18 and PBX 16 may be referred to as an enterprise communications platform, generally designated 14. It will be appreciated that the enterprise communications platform 14 and, in particular, the SMP 18, is implemented on one or more servers having suitable communications interfaces for connecting to and communicating with the PBX 16 and/or DID/PRI trunks. Although the SMP 18 may be implemented on a stand-alone server, it will be appreciated that it may be implemented into an existing control agent/server as a logical software component. As will be described below, the SMP 18 may be implemented as a multi-layer platform.

The enterprise communications platform 14 implements the switching to connect session legs and may provide the conversion between, for example, a circuit-switched call and a VoIP call, or to connect legs of other media sessions. In some embodiments, in the context of voice calls the enterprise communications platform 14 provides a number of additional functions including automated attendant, interactive voice response, call forwarding, voice mail, etc. It may also implement certain usage restrictions on enterprise users, such as blocking international calls or 1-900 calls. In many embodiments, Session Initiation Protocol (SIP) may be used to set-up, manage, and terminate media sessions for voice calls. Other protocols may also be employed by the enterprise communications platform 14, for example, Web Services, Computer Telephony Integration (CTI) protocol, Session Initiation Protocol for Instant Messaging and Presence Leveraging Extensions (SIMPLE), and various custom Application Programming Interfaces (APIs), as will be described in greater detail below.

One of the functions of the enterprise communications platform 14 is to extend the features of enterprise telephony to the mobile devices 11. For example, the enterprise communications platform 14 may allow the mobile device 11 to perform functions akin to those normally available on a standard office telephone, such as the digital telephone set 17 or analog telephone set 19. Example features may include direct extension dialing, enterprise voice mail, conferencing, call transfer, call park, etc.

Figure 6:
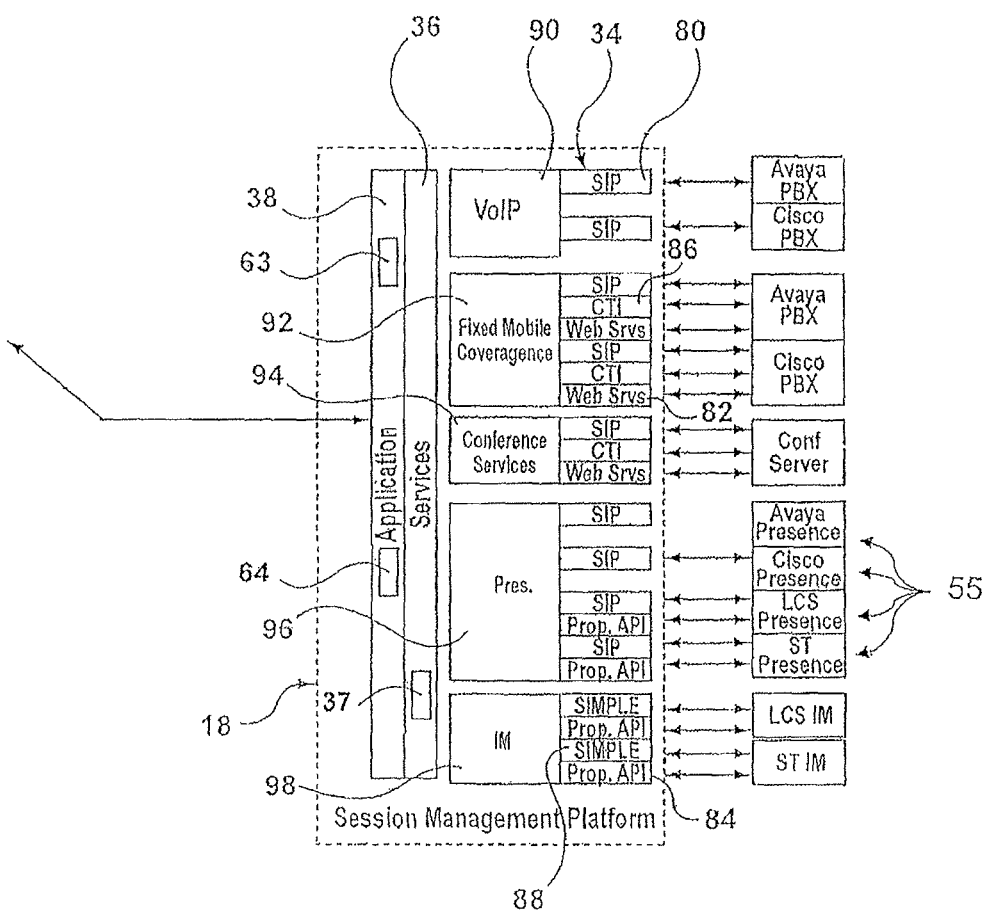
FIG. 6 shows a block diagram of an example session management platform for use in an example embodiment of the present disclosure.

Reference is now made to FIG. 6, which shows an embodiment of the enterprise communications system 14 with a Third Party Call Control architecture. In this embodiment, the SMP 18 is a multi-layer platform that includes a protocol layer 34, a services layer 36 and an application layer 38. The protocol layer 34 includes a plurality of interface protocols configured for enabling operation of corresponding applications in the application layer 38. The services layer 36 includes a plurality of services that can be leveraged by the interface protocols to create richer applications. Finally, the application layer 38 includes a plurality of applications that are exposed out to the communication devices and that leverage corresponding ones of the services and interface protocols for enabling the applications.

For example, the protocol layer 34 can include, among other things, a Session Initiation Protocol or SIP 80, a Web Services protocol 82, an Application Programming Interface or API 84, a Computer Telephony Integration protocol or CTI 86, and a Session Initiation Protocol for Instant Messaging and Presence Leveraging Extensions or SIMPLE protocol 88. It is contemplated that the interface protocols 80-88 are plug-ins that can interface directly with corresponding servers, which will be further described below.

For the purposes of this disclosure, SIP 80 will be utilized, although it is appreciated that the system 10 can operate using the above disclosed or additional protocols. As known by those of ordinary skill in the art, SIP is the IETF (Internet Engineering Task Force) standard for multimedia session management, and more specifically is an application-layer control protocol for establishing, maintaining, modifying and terminating multimedia sessions between two or more endpoints. As further known by those of ordinary skill in the art, the SIP protocol 80 includes two interfaces for signaling: SIP-Trunk (hereinafter referred to as "SIP-T") and SIP-Line (hereinafter referred to as "SIP-L"). Specifically, the SIP-T interface is utilized when the endpoint is a non-specific entity or not registered (i.e., when communicating between two network entities). In contrast, the SIP-L interface is utilized when the endpoint is registered (i.e., when dialing to a specific extension). The specific operation of the system 10 utilizing SIP 80 will be described in further detail below.

The SMP 18 also includes a plurality of enablers, among other things, a VoIP enabler 90, a Fixed Mobile Convergence or FMC enabler 92, a conference services enabler 94, a presence enabler 96 and an Instant Messaging or IM enabler 98. Each of the enablers 90-98 are used by corresponding services in the services layer 36 that combine one or more of the enablers. Each of the applications in the application layer 38 is then combined with one or more of the services to perform the desired application. For example, a phone call service may use the VoIP or PBX enabler, and an emergency response application may use the phone call service, an Instant Messenger service, a video call service, and email service and/or a conference service. As a further example, a presence service 37 may use the presence enabler 96 to acquire presence data and a maintenance application 63 may use the presence service 37.

The application layer 38 may include a presence application 63 that uses the presence service 37 which in turn uses the presence enabler 96, to provide centralized presence data from one or more presence servers 55. As shown in FIG. 4, each presence server 55 is associated with a different PBX 16 or instant messaging (IM) server, for example Microsoft Live Communications Server TM (LCS) IM or Skype (ST) IM, Other presence servers 55 or sources of presence data could be used by the presence application 63 and form part of the SMP 18 as desired.

The presence application 63 may be accessed by a device 201 to obtain external presence data. The presence application 63 may be accessed by the maintenance server 327 to utilize presence data or provide presence data to a device 201. The presence application 63 may aggregate presence data for retrieval by a device 201. The presence application 63 may simply make the presence service 37 available to a device to access one or more presence servers 55 through the presence enabler 96. The presence application 63 acts as a presence server 331 for the device 201. The presence application 63 can act on a "push" or "pull" model, sending data to the device 201 as the presence data is updated or waiting for the device 201 to poll the presence application 63 for updated presence data.

The application layer 38 may also include a maintenance application 64 that acts as the maintenance server 327 and is accessible for session based communications between the device 201 and the maintenance server as part of the SMP 18. The maintenance server 327 can be available for access by a system administrator, for example, through a computer on network 124 such as computer 117.

As seen in FIG. 6, the presence servers 55 are in communication with the presence services enabler 96 preferably through the SIP protocol 80, although it is recognized that other or additional protocols may be utilized.

While the present disclosure is sometimes described in terms of methods, a person of ordinary skill in the art will understand that the present disclosure is also directed to various apparatus including components for performing at least some of the aspects and features of the described methods, be it by way of hardware components, software or any combination of the two, or in any other manner. Moreover, an article of manufacture for use with the apparatus, such as a prerecorded storage device or other similar computer readable medium including program instructions recorded thereon, or a computer data signal carrying computer readable program instructions may direct an apparatus to facilitate the practice of the described methods. It is understood that such apparatus, articles of manufacture, and computer data signals also come within the scope of the present disclosure.

The various embodiments presented above are merely examples and are in no way meant to limit the scope of this disclosure. Variations of the innovations described herein will be apparent to persons of ordinary skill in the art, such variations being within the intended scope of the present application. In particular, features from one or more of the above-described embodiments may be selected to create alternative embodiments comprised of a sub-combination of features which may not be explicitly described above. In addition, features from one or more of the above-described embodiments may be selected and combined to create alternative embodiments comprised of a combination of features which may not be explicitly described above. Features suitable for such combinations and sub-combinations would be readily apparent to persons skilled in the art upon review of the present application as a whole. The subject matter described herein and in the recited claims intends to cover and embrace all suitable changes in technology.

The invention claimed is:

1. A method of performing maintenance on a mobile communications device, the mobile communications device in communication with a remote maintenance server of a mobile communications system associated with the mobile communications device, the method for executing by the mobile communications device and comprising:
   determining whether the mobile communications device is in a device context as specified by a device context condition set that includes at least one condition based on presence data used to determine availability of a user of the mobile communications device to participate in communications, wherein the device context condition set specifies that the mobile communications device is in a device context for collecting an actual device context parameter set when the user is not available to participate in communications;
   responsive to determining, using the presence data, that the mobile communications device is in the device context as specified by the device context condition set, collecting the actual device context parameter set of device context parameters specified in a desired device context parameter set of device context parameters;
   analyzing the collected actual device context parameter set to determine if maintenance is warranted for the mobile communications device by comparing the collected actual device context parameters to normal device context parameters for the mobile communications device context; and
   communicating information extracted by the analysis to the remote maintenance server.

2. The method of claim 1 further comprising storing the collected actual device context parameter set on the mobile communications device.

3. The method of claim 1 wherein the presence data includes presence data obtained by the mobile communications device from one or more sources on the mobile communications device.

4. The method of claim 1 wherein the presence data includes presence data obtained by the mobile communications device from a source of presence data external to the mobile communications device.

5. The method of claim 1 further comprising maintaining a first communications channel between a source of presence data and the mobile communications device, while collecting device context parameters through a device capability for a second communications channel.

6. The method of claim 1 wherein the mobile communications device context condition set indicates that the mobile communications device is likely to remain in the mobile communications device context while collection of the mobile communications device context parameter set occurs.

7. The method of claim 1 further comprising:
   determining normal device context parameters by determining if a mobile communications device is in a device context as specified by a device context condition set;
   if the mobile communications device is in the device context as specified by a device context condition set then collecting from the mobile communications device an actual device context parameter set of device context parameters specified in a desired device context parameter set of device context parameters; and
   deriving normal operating context parameters from the actual device context parameter set collected as part of determining normal operating device context parameters.

8. The method of claim 1 further comprising responsive to determining that maintenance is warranted for a mobile communications system of the mobile communications device, notifying a maintenance server for the mobile communications system.

9. The method of claim 1 further comprising maintaining a first communications channel between the maintenance server and the mobile communications device, while collecting device context parameters through a device capability for a second communications channel.

10. The method of claim 9 wherein the maintained communication channel is a session based communication channel.

11. The method of claim 1 wherein:
   when the presence data indicates the mobile communications device is currently not in use by the user and the mobile communications device is determined to be in the device context for collecting the actual device context parameter set at the current time; and
   when the presence data indicates the mobile communications device is expected to be not in use by the user at a future time and the mobile communications device is determined to be in the device context for collecting the actual device context parameter set at the future time.

12. A mobile communications device comprising a handheld casing comprising:
   a central processing unit;

a wireless communication subsystem communicatively coupled with the central processing unit; and a memory storing instructions which, when operating on the central processing unit, cause the mobile communications device to:

determine whether the mobile communications device is in a device context as specified by a device context condition set that includes at least one condition based on presence data used to determine availability of a user of the mobile communications device to participate in communications, wherein the device context condition set specifies that the mobile communications device is in a device context for collecting an actual device context parameter set when the user is not available to participate in communications;

responsive to determining, using the presence data, that the mobile communications device is in the device context as specified by the device context condition set, collecting the actual device context parameter set of device context parameters specified in a desired device context parameter set of device context parameters;

analyze the collected actual device context parameter set to determine if maintenance is warranted for the mobile communications device by comparing the collected actual device context parameters to normal device context parameters for the mobile communications device context; and cause the wireless communication subsystem to communicate information extracted by the analysis to a remote maintenance server.

13. The mobile communications device of claim 12, wherein the instructions, when operating on the central processing unit, further cause the mobile communications device to obtain at least a portion of the presence data from a source of presence data external to the mobile communications device.

14. The mobile communications device of claim 12, wherein the instructions, when operating on the central processing unit, further cause the mobile communications device to:

when the presence data indicates the mobile communications device is currently not in use by the user, determine that the mobile communication device is in the device context for collecting the actual device context parameter set at the current time; and when the presence data indicates the mobile communications device is expected to be not in use by the user at a future time, determine that the mobile communication device is in the device context for collecting the actual device context parameter set at the future time.

15. A mobile communications system comprising:

a plurality of mobile communications devices, each comprising: a central processing unit; a wireless communication subsystem communicatively coupled with the central processing unit; and a memory storing instructions which, when operating on the central processing unit, cause the mobile communications device to:

determine if the mobile communications device is in a device context as specified by a device context condition set that includes at least one condition based on presence data used to determine availability of a user of the mobile communications device to participate in communications, wherein the device context condition set specifies that the mobile communications device is in a device context for collecting an actual device context parameter set when the user is not available to participate in communications;

responsive to determining, using the presence data, that the mobile communications device is in the device context as specified by a device context condition set, collect from the mobile communications device the actual device context parameter set of device context parameters specified in a desired device context parameter set of device context parameters;

analyze the collected actual device context parameter set to determine if maintenance is warranted for the mobile communications device by comparing the collected actual device context parameters to normal device context parameters for the mobile communications device context; and cause the wireless communication subsystem to communicate information extracted by the analysis to a remote maintenance server.

16. The mobile communications system of claim 15, further comprising a presence server configured to generate at least a portion of the presence data; wherein the instructions, when operating on the central processing unit of the mobile communications device, cause the mobile communications device to obtain at least the portion of the presence data from the presence server.

17. The mobile communications system of claim 15, wherein the instructions, when operating on the central processing unit of the mobile communications device, cause the mobile communications device to:

when the presence data indicates the mobile communications device is currently not in use by the user, determine that the mobile communication device is in the device context for collecting the actual device context parameter set at the current time; and when the presence data indicates the mobile communications device is expected to be not in use by the user at a future time, determine that the mobile communication device is in the device context for collecting the actual device context parameter set at the future time.

18. A non-transitory computer program product comprising:

a computer readable medium; and stored on the computer readable medium, computer executable instructions which, when operating on a central processing unit of a mobile communications device, cause the mobile communications device to:

determine whether the mobile communications device is in a device context as specified by a device context condition set that includes at least one condition based on presence data used to determine availability of a user of the mobile communications device to participate in communications, wherein the device context condition set specifies that the mobile communications device is in a device context for collecting an actual device context parameter set when the user is not available to participate in communications;

responsive to determining, using the presence data, that the mobile communications device is in a device context as specified by the device context condition set, collect an actual device context parameter set of device context parameters specified in a desired device context parameter set of device context parameters;

analyzing the collected actual device context parameter set to determine if maintenance is warranted for the mobile communications device by comparing the collected actual device context parameters to normal device context parameters for the mobile communications device context; and communicate information extracted by the analysis to the remote maintenance server.

19. The non-transitory computer program product of claim 18, wherein the instructions, when operating on the central processing unit, further cause the mobile communications device to:
- when the presence data indicates the mobile communications device is currently not in use by the user, determine that the mobile communication device is in the device context for collecting the actual device context parameter set at the current time; and
- when the presence data indicates the mobile communications device is expected to be not in use by the user at a future time, determine that the mobile communication device is in the device context for collecting the actual device context parameter set at the future time.

* * * * *